United States Patent [19]
Yu

[11] Patent Number: 5,764,903
[45] Date of Patent: Jun. 9, 1998

[54] HIGH AVAILABILITY NETWORK DISK MIRRORING SYSTEM

[75] Inventor: Ying-King Yu, Sunnyvale, Calif.

[73] Assignee: Acer America Corporation, San Jose, Calif.

[21] Appl. No.: 312,869

[22] Filed: Sep. 26, 1994

[51] Int. Cl.$^6$ .................................................. G06F 13/00
[52] U.S. Cl. ................... 395/200.38; 395/439; 395/825
[58] Field of Search .......................... 395/826, 200.03, 395/200.05, 200.08, 182.04, 441, 825, 872; 364/966.5, 968, 242.84, 280, 284.4, 285.3

[56] References Cited

U.S. PATENT DOCUMENTS

| | | | |
|---|---|---|---|
| 4,244,019 | 1/1981 | Anderson et al. | 395/200.05 |
| 4,590,554 | 5/1986 | Glazer et al. | 395/182.11 |
| 4,700,292 | 10/1987 | Campnaini | 395/200.2 |
| 4,958,270 | 9/1990 | McLaughlin et al. | 364/187 |
| 5,051,887 | 9/1991 | Berger et al. | 395/489 |
| 5,065,354 | 11/1991 | Jons et al. | 395/182.03 |
| 5,086,502 | 2/1992 | Malcolm | 395/182.06 |
| 5,088,021 | 2/1992 | McLaughlin et al. | 364/187 |
| 5,157,663 | 10/1992 | Major et al. | 395/182.08 |
| 5,206,934 | 4/1993 | Naef, III | 395/200.04 |
| 5,379,374 | 1/1995 | Ishizaki et al. | 395/155 |
| 5,390,313 | 2/1995 | Yanai et al. | 395/425 |
| 5,392,244 | 2/1995 | Jacobsen et al. | 365/200 |
| 5,398,331 | 3/1995 | Huang et al. | 395/575 |
| 5,432,922 | 7/1995 | Polyzois et al. | 395/425 |
| 5,434,994 | 7/1995 | Shaheen et al. | 395/500 |
| 5,435,004 | 7/1995 | Cox et al. | 395/575 |
| 5,446,855 | 8/1995 | Dang et al. | 395/401 |
| 5,452,448 | 9/1995 | Sakuraba et al. | 395/600 |
| 5,459,857 | 10/1995 | Ludlam et al. | 395/182.04 |
| 5,479,653 | 12/1995 | Jones | 395/182.03 |
| 5,488,731 | 1/1996 | Mendelsohn | 395/800 |

*Primary Examiner*—Thomas C. Lee
*Assistant Examiner*—Anderson I. Chen
*Attorney, Agent, or Firm*—Townsend and Townsend and Crew LLP

[57] ABSTRACT

The present invention provides methods for mirroring hard disk data of a primary server over a network to a secondary server. A virtual disk driver is provided between the operating system and the hard disk driver of the primary server. After the virtual disk driver receives a disk write request that should be mirrored, the virtual disk driver first sends a disk write request to the secondary server. The virtual disk driver then sends the disk write request to a disk drive on the primary server. In the event data residing on one server is unavailable due to a system failure, the same data would still be available on the other server. Multiple methods of synchronous and asynchronous disk mirroring are provided. The present invention provides a very low overhead and results in high performance and availability.

31 Claims, 9 Drawing Sheets

HIGH AVAILABILITY NETWORK DISK MIRRORING SYSTEM

BACKGROUND OF THE INVENTION

The present invention relates generally to high availability computer systems and, more particularly, to a system for efficiently mirroring a hard disk drive over a network.

Computer networking has come to play a central role in information processing and distribution. One of the major factors driving the widespread introduction of computer networks has been the proliferation of inexpensive small computer systems, especially personal computers. As the price of small computer systems has been falling, their speed and capabilities have been increasing. Small computer systems now have capabilities that rival mainframe computers of ten years ago.

Networks are a way to connect multiple computer systems so that they can share information, data, and resources. Computer systems on the network can send and receive messages, access shared databases, and share peripherals like printers. A network usually has one server that manages the access to shared data or resources. The server runs a network operating system and services requests from other computer systems on the network. The other computer systems are generally referred to as clients.

There are many different kinds of networks, such as local area networks (LANs), wide area networks (WANs), and metropolitan area networks (MANs). The network classification generally depends on the distance between computer systems on the network, the number of computer systems, and the data transmission rates. All networks allow data to be distributed among computer systems. However, as more computer systems on the network begin to rely on the shared data, the availability of the data becomes of paramount importance. Not only must the data be accessible after a server crashes, the time required to make the data available must be as short as possible. Thus, there is also the need to have another computer system available to supply the data to other computer systems. As a result, methods and systems have been created to improve the availability of data and systems.

Numerous prior art methods exist for increasing the availability of data on a single computer system. One method is the Redundant Array of Inexpensive Disks (RAID) technology which does disk mirroring and striping at the hardware level to increase the availability of data However, a server utilizing these methods continues to have a single point of failure because if the RAID hardware (in particular the controller) goes down, the data is unavailable.

Fault tolerant computer systems such as those from Tandem or Stratus typically attain high system availability by replicating hardware components within one computer. These computer systems provide a very high level of fault tolerance such as no single point of failure for hardware and transparent failover. This class of computer systems is typically the most expensive on the market. Each system uses one computer and is limited to a single site. Thus, these computers cannot withstand a natural disaster like a fire or earthquake. A server utilizing these methods can still go down, making the data unavailable.

Novell NetWare System Fault Tolerance (SFT) III uses two separate computers to mirror all the client requests to a primary server on a backup server over a high-speed data link. The backup server is dedicated to mirroring the primary server and it concurrently runs the software executing on the primary server. If the primary server goes down, the backup server transparently takes over while the primary server is being repaired. However, this technology suffers from performance degradation and high cost.

SUMMARY OF THE INVENTION

The present invention provides high-performance methods and systems for mirroring or duplicating hard disk data over a network with very low network overhead. In a system of the present invention having one primary and one or more secondary servers, a virtual disk driver is provided between the operating system and the hard disk driver of the primary server. The virtual disk driver manages the timing of when the disk write requests will be sent to disk drives on the primary and secondary servers. The operating system and hard disk driver remain unchanged and the virtual disk driver is transparent to the user.

A major concern of mirroring disks is performance. In disk mirroring, each disk write request is translated into multiple disk write requests, one for each hard drive configured to store the data. If the physical disk writes are carried out serially, then the speed of the disk writes will be cut by more than half that of the non-mirrored disk writes. The present invention provides methods for achieving high performance in carrying out the disk writes without sacrificing availability.

In a system according to the present invention, the virtual disk driver first sends the disk write request to the secondary server. After the disk write request is sent to the secondary server, the virtual disk driver sends the disk write request to the appropriate local hard drive driver on the primary server. Sending the disk write request to the secondary server first achieves low overhead for mirroring the data while providing high availability of the data as will be discussed in detail later. Furthermore, high performance is achieved because the disk writes requests are processed concurrently or in parallel.

The present invention provides multiple embodiments or procedures that achieve varying degrees of performance and availability. In one embodiment, the primary server sends the disk write request to the local disk drive driver only after the secondary server has acknowledged receipt of the disk write request. In another embodiment, the primary server sends the disk write request to the local disk drive driver right after the disk write request is sent to the secondary server. These embodiments may be configured to support synchronous or asynchronous disk write requests.

The present invention can be used to mirror partitions of a hard drive or mirror the entire file system of the primary server. Additionally, the secondary server need not be dedicated to hard disk mirroring of the primary server.

In one implementation, the present invention operates under the Santa Cruz Operations (SCO) UNIX operating system. A user level daemon (which is a process running in the background) is used to set up a Network Disk (ND) kernel module. The Network Disk module consists of two components: a Network Disk Driver (NDD) and a Network Disk Module (NDM). NDD operates between the file system and the disk driver. NDM performs the network communication between the primary and secondary servers. The implementation is designed to be symmetric so that the same software runs on both the primary and secondary servers.

A further understanding of the nature and advantages of the present invention may be realized by reference to the remaining portions of the specification and the drawings.

DESCRIPTION OF THE PREFERRED EMBODIMENT

System Overview

The present invention is directed at mirroring hard disk data over a network. The present invention can mirror a single partition of a hard drive or the entire file system including multiple partitions and hard drives. For simplicity, the present invention is often described as being implemented in a network with one primary server and one secondary server. However, the present invention may also be implemented with one primary server and multiple secondary servers. Thus, the scope of the present invention is not limited to a network with two servers.

Figure 1:
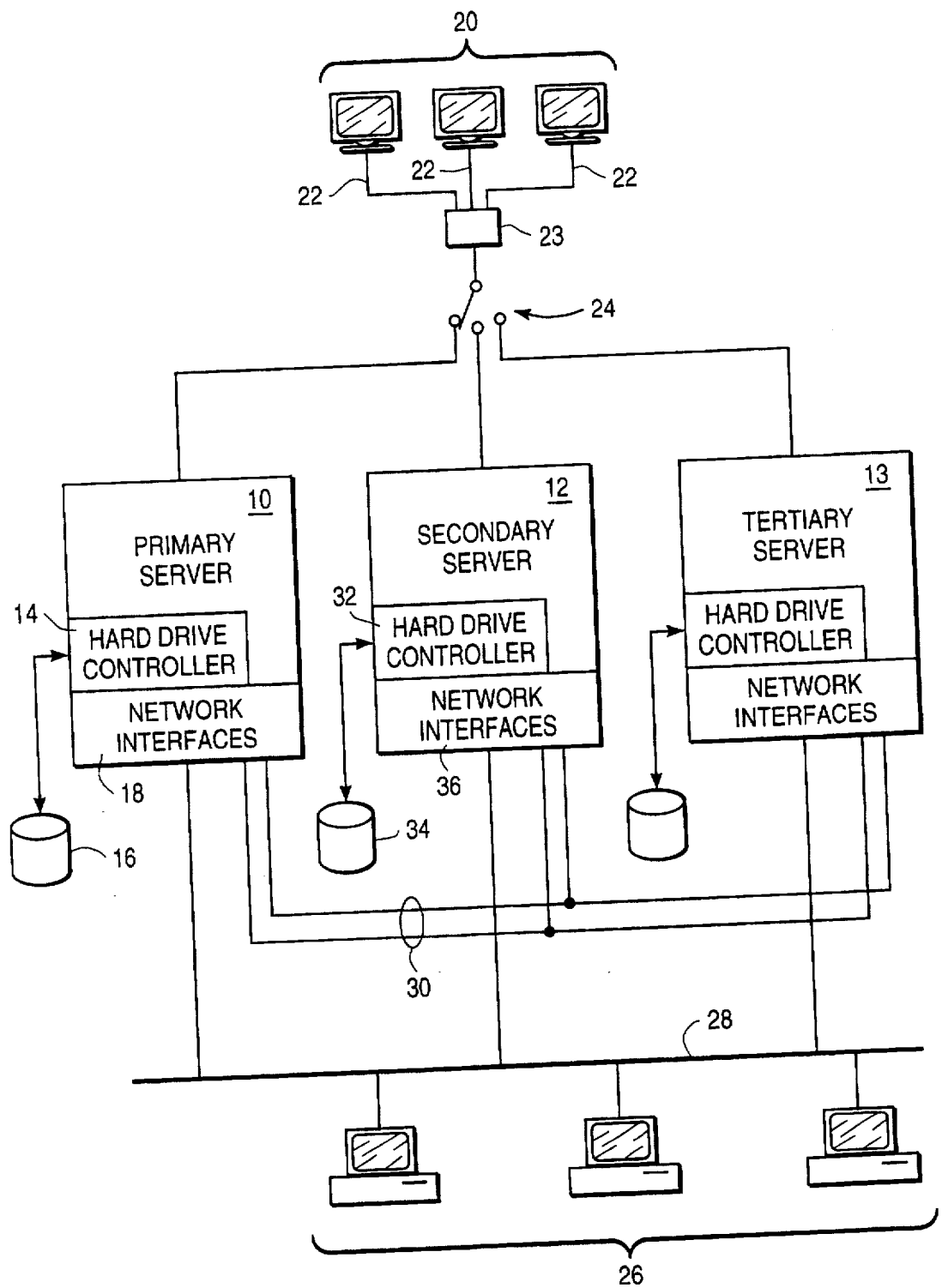
FIG. 1 illustrates a typical hardware environment for the present invention.

A typical hardware environment for the present invention is shown in FIG. 1. Three servers are shown in the computer networking environment: a primary server 10, a secondary server 12, and a tertiary server 13. In the detailed description that follows, the secondary server is used to mirror data on the primary server. However, for increased availability, the tertiary server and other servers (not shown) could be used as secondary servers to mirror data on the primary server.

The primary server is the computer system that is actively servicing the users by providing access to shared data and peripherals to other computer systems. The primary server includes a hard drive controller 14 that allows the primary system to read from and write to a local hard disk 16 that store the files needed to run the primary server and files containing data that may be requested by client computer systems. The primary server also includes network interfaces 18 that are the hardware that allow communication with other computer systems over network media.

There are numerous types of client computer systems that may be connected to a server. One type is a terminal that is attached to the server through a serial cable. A terminal usually has no internal hard drive. As it has no hard drive, all file requests by a terminal must be serviced by the server. A terminal may be "dumb" or "smart" depending on whether the terminal has its own memory. Smart terminals typically provide simple screen and editing functions to the user. Although the server also services the processing requests of a terminal, like a mainframe computer, the present invention is primarily concerned with file requests.

In FIG. 1, terminals 20 are connected to the primary server through serial cables 22 and a terminal concentrator unit 23. If the primary server goes down, the terminals have to be physically disconnected from the primary server and reconnected to the secondary server. In order to simplify this process, a switch 24 is provided along the serial cable to allow a system administrator to switch the terminals to the secondary server.

Another type of client computer system has its own processor, memory, and hard drive. Client computer systems of this type are actually fully functioning computers capable of processing and storing data without the server. Typically, these small computer systems are personal computers.

Still referring to FIG. 1, client computer systems 26 are connected to the primary and secondary servers via a network medium 28. The primary server communicates with the secondary server over high-speed data links 30. The data links have a high data transmission rate (e.g., ethernet or FDDI). In one implementation, the data links are dedicated (i.e. sole function) to mirroring disk write requests over the data links. At least one data link is required; however, two data links are shown for providing increased throughput and redundancy. If one of the data links goes down, the other is available to take the full load of data flow.

The primary server communicates over the network medium and data links through network interfaces 18. Thus, the network interfaces include the hardware for the primary server to communicate with the client computer systems and the secondary server.

The secondary server has hardware that is analogous to the hardware on the primary server. The secondary server has a hard drive controller 32, a remote hard disk 34 (remote to the primary server) and network interfaces 36. For simplicity, the primary and secondary servers have been shown with a single hard drive and a single hard drive controller. However, the present invention is not limited to such servers and may be implemented on other hardware configurations.

Figure 2:
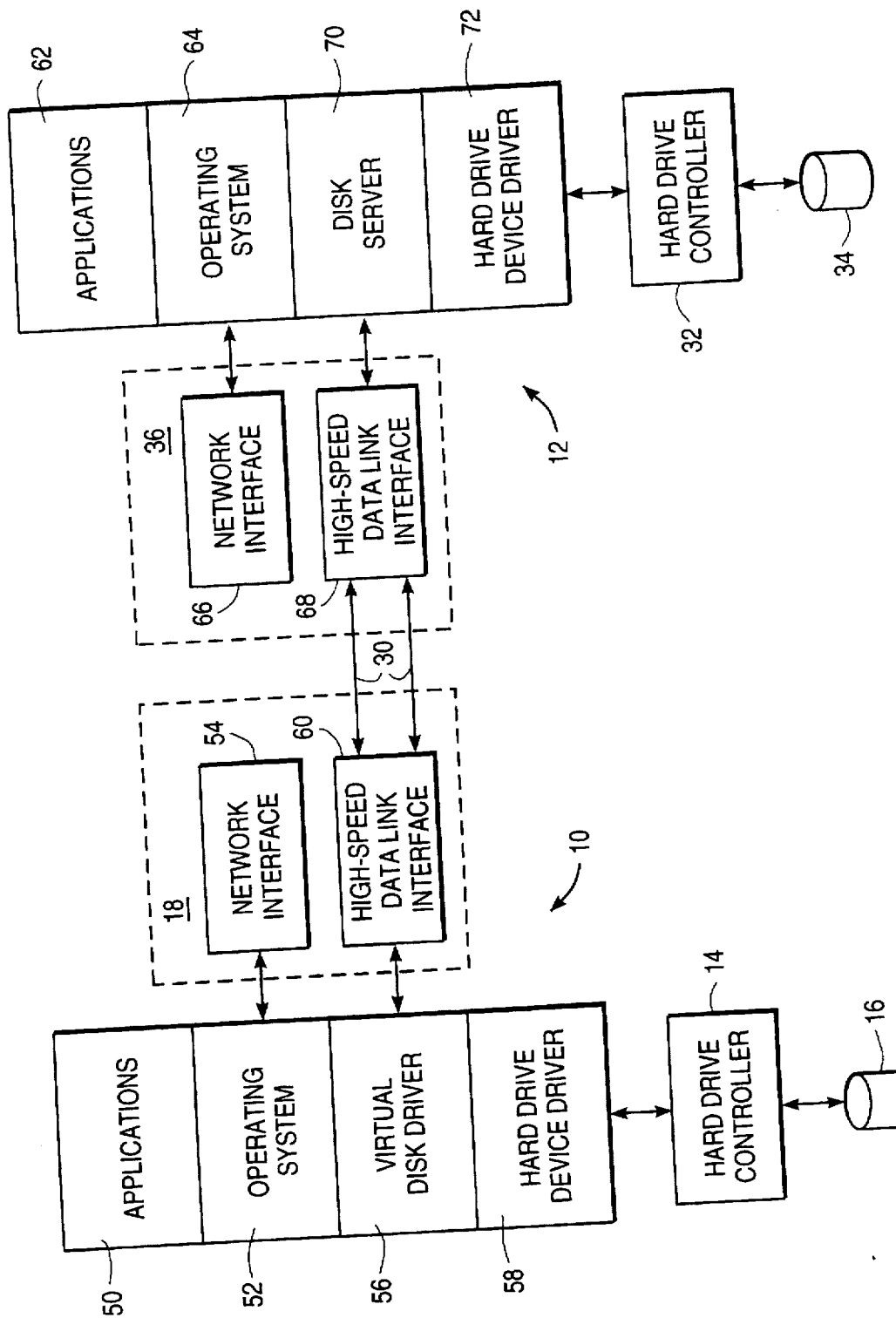
FIG. 2 illustrates a hierarchical view of the software and hardware components of the primary and secondary servers.

FIG. 2 shows a hierarchical view of the software and hardware components of the primary and secondary servers according to the present invention. At the highest level, applications 50 run on primary server 10. The applications may include word processors, database managers, language compilers, and the like. As an application needs to write data to a hard disk on the primary server, the application makes a call to an operating system 52. The operating system in turn issues a hard disk write request. Although the applications are shown running on the primary server, they may also be running on client computer systems 26. If the applications are running on the client computer systems, the applications would communicate with software on the primary server through a network interface 54.

If the operating system receives a call to write data to the partition that is being mirrored according to the present invention, the disk write request is sent to a virtual disk driver 56. Other disk write requests are sent directly to a hard drive device driver 58.

Once the virtual disk driver receives a hard disk write request, it first sends the disk write request, including the data to be written, to the secondary server via a high-speed data link interface 60. The high-speed data link interface is the hardware that allows the primary server to send and receive information over high-speed data links 30. For simplicity, FIG. 2 does not show the software drivers that control the network interfaces.

The virtual disk driver then initiates the disk write request to the local hard disk on the primary server by sending the disk write request to hard drive device driver 58. The hard drive device driver is software that is specifically written for the physical hard drive on the primary server. The hard drive device driver then makes a call to hard drive controller 14 which is the hardware that controls the operation of local hard drive 16.

Secondary server 12 has software and hardware analogous to the primary server including applications 62, an operating system 64, and a network interface 66. The secondary server receives a disk write request from the primary server through a high-speed data link interface 68. The high-speed data link interface sends the disk write requests to a disk server 70 which then sends the disk write requests to a hard drive device driver 72. The hard drive device driver then makes a call to hard drive controller 32 which is the hardware that controls the operation of remote hard drive 34.

In the description of the embodiments that follow, it is assumed that if a problem (e.g., system crash, hard disk failure, etc.) occurs on the secondary server, it will not be before or immediately after a problem on the primary server occurs. Typically, "immediately after" is measured as a few milliseconds.

Embodiment with Acknowledgment Before Primary Write

The operation of the virtual disk driver will now be discussed in more detail in reference to FIG. 3, which shows a process of mirroring a hard disk write request on the secondary server according to the present invention. This embodiment guarantees that the secondary server will be at least as current as the primary server even if the data links between the primary and secondary server have a delay.

Figure 3:
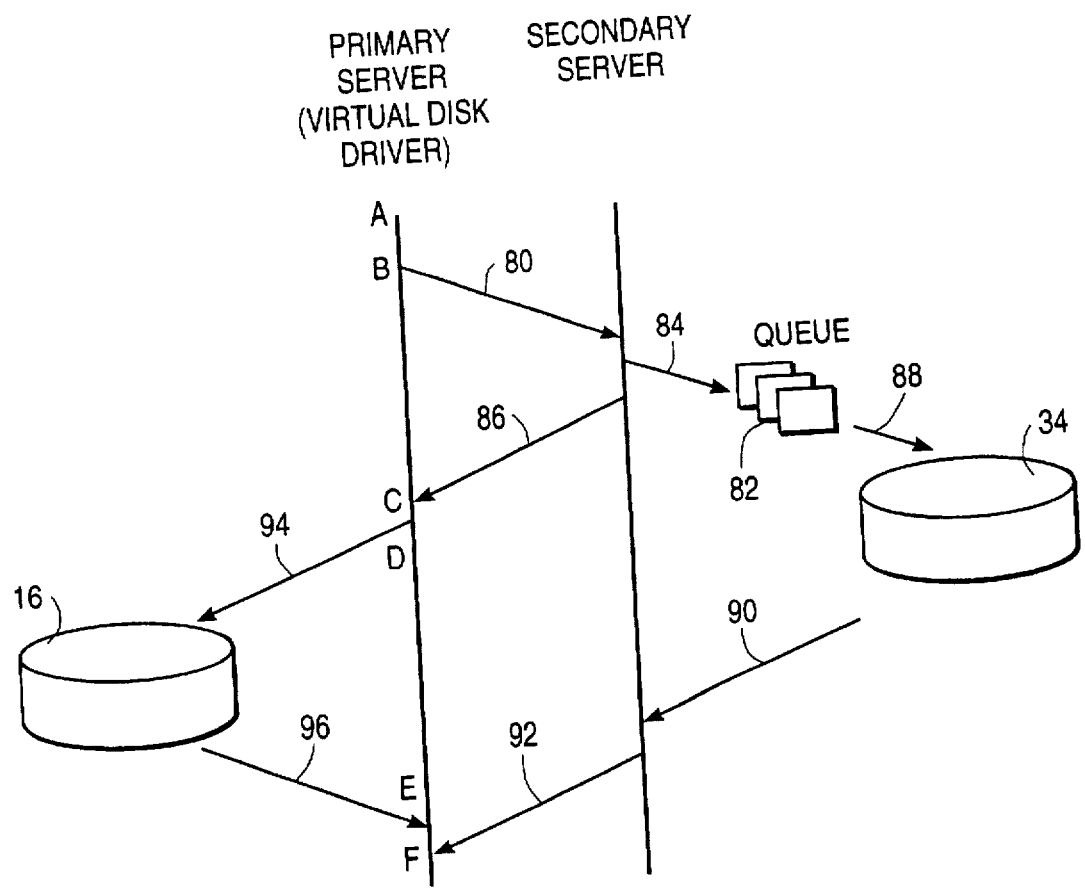
FIG. 3 illustrates a process of mirroring a hard disk write request on the secondary server.

In FIG. 3, the vertical lines represent time lines for the execution of a disk write request on both servers. After an application makes a call to the operating system to write data to the mirrored disk drive, the application transfers control to the operating system until control is returned to the application. At time A, the virtual disk driver receives a disk write request from the operating system. The virtual disk driver then prepares the disk write request to be transmitted to the secondary server. At time B, the virtual disk driver sends the disk write request to the secondary server via the high-speed data links as shown by arrow 80.

After the secondary server receives the disk write request, it puts the disk write request on a write queue 82 as shown by arrow 84. Preferably, the queue is a first-in first-out (FIFO) queue so that the disk write requests are performed in the order received. The secondary server then sends an acknowledgment message to the virtual disk driver via the high-speed data links as shown by arrow 86. At time C, the virtual disk driver receives the acknowledgment message over the data links. The virtual disk driver is inactive or sleeps between time B and time C so that other processes may be performed by the primary server. However, if the virtual disk driver does not receive the acknowledgment within a predetermined time period, the virtual disk driver resends the disk write request to the secondary server.

Depending on the implementation, the secondary server may or may not be dedicated to mirroring disk write requests. In either case, the queue provides a way for the secondary server to store disk write requests. The secondary server sends the disk write request to remote hard drive 34 as shown by arrow 88. After the disk write request is performed on hard drive 34, the secondary server is notified that the write is complete as shown by arrow 90. The secondary server then sends an message to the virtual disk driver via the high-speed data links that the disk write is complete as shown by arrow 92.

At time D, the virtual disk driver sends the disk write request to local hard drive 16 as shown by arrow 94. After the disk write request is complete on hard drive 16, the virtual disk driver is notified at time E as shown by arrow 96. At time F, the virtual disk driver receives the message via the high-speed data links that the disk write is complete on the secondary server. Although the virtual disk driver is shown being notified that the local disk write was complete before the remote disk write, this is not necessarily the case. Depending on such factors as the hardware, relative server loads, and timing, the remote disk write may be completed first.

After the virtual disk driver has received both messages that the local and remote disk writes are complete, the control returns to the calling application. This is referred to as synchronous disk write operation because control does not return to the calling application until the disk write request is committed to both the local and remote disks. Synchronous disk writes provide a high degree of availability because it assures that the disk write request has been committed to the remote disk.

The process of FIG. 3 may also be used to implement what is referred to as asynchronous disk write operation. Asynchronous disk writes return control to the calling application as soon as the disk write request is sent to the local disk, which is after time D. Asynchronous disk writes may provide a performance increase but there is no guarantee that the disk write request has been committed to the local or remote disk.

Figure 4:
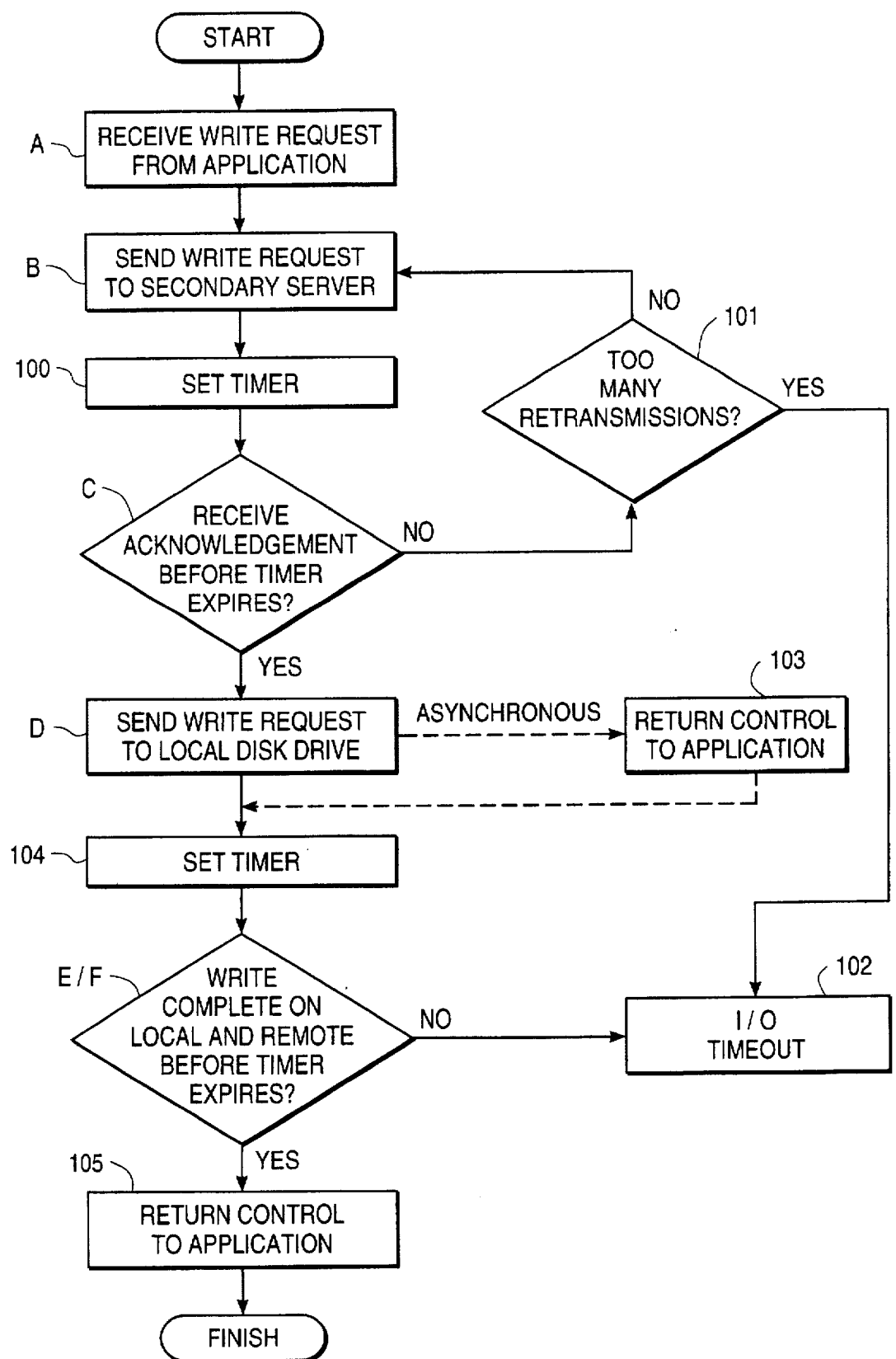
FIG. 4 illustrates the high level flow of the primary server performing the process of FIG. 3.

FIG. 4 shows a high level flowchart of the process of FIG. 3 as it executes on the primary server. Where a step corresponds to one of the times labelled in FIG. 3, the step is labelled with the same letter. In step A, the virtual disk driver receives a disk write request from an application that should be mirrored on the secondary server. At this time, the application typically has transferred control to the operating system. The virtual disk driver then sends the disk write request to the secondary server as in step B.

In step 100, the virtual disk driver sets an interrupt timer for a predetermined amount of time. Although the virtual disk driver may wait using polling or interrupts, interrupts are described herein because they may provide the best performance. Although the virtual disk driver is shown setting multiple interrupt timers, in one implementation a global clock timer interrupts the virtual disk driver at specific intervals. The virtual disk driver measures the time elapsed by how many of interval interrupts have been received.

In step C, the virtual disk driver waits to receive an acknowledgment message from the secondary server that the disk write request was received by the secondary server. The acknowledgment message should be received before the virtual disk driver receives the timer interrupt, meaning the timer expired. If the virtual disk driver receives the timer interrupt first, the virtual disk driver checks to see if the disk write request has already been sent to the secondary server a predetermined number of times as shown in step 101. If not, the virtual disk driver will resend the disk write request as shown. Otherwise, the virtual disk driver has an input/output (I/O) timeout as shown in step 102. The disk write request is considered failed on the occurrence of an I/O timeout on the secondary server. Consequently, future disk write requests will not be mirrored on the secondary server.

If the virtual disk driver receives the acknowledgment message before the timer expires, the virtual disk driver sends the disk write request to the local disk drive as shown in step D. If the disk write is asynchronous, the virtual disk driver then returns control to the application as shown in step 103.

In step 104, the virtual disk driver sets an interrupt timer for a predetermined amount of time. The virtual disk driver then waits to receive a message that the disk write request is complete on the local disk drive before the timer expires as shown in step E/F. Step E/F is shown as one step because of interrupt processing. If the timer expires first, the virtual disk driver has an I/O timeout as shown in step 102. The virtual disk driver will generally process an I/O timeout depending on which server caused the timeout. If the primary server caused the timeout, the virtual disk driver may proceed because the data is available on the secondary server. However, if the secondary server caused the timeout, the virtual disk driver preferably treats this as a real timeout so that the data will be available if the primary fails. In either case, a warning message is typically sent to the system administrator that a particular server had an I/O timeout, often indicating a hardware problem on the server. The system administrator then takes appropriate action keeping in mind that the data residing on the server having the I/O timeout is no longer reliable.

If the virtual disk driver receives messages that the disk write request is complete on both the local and remote disk drives before the timer expires, the virtual disk driver returns control to the calling application as shown in step 105. This step will only be performed for a synchronous disk write because if the disk write is asynchronous, control has already been returned to the application in step 103. However, the receipt of the messages that the disk write request is complete on both local and remote hard disks allows resources to be freed up on the primary server.

This embodiment provides high performance and guarantees that the secondary server will be at least as current as the primary server even if the data links between the primary and secondary server have a delay.

Embodiment Without Acknowledgment Before Primary Write

Figure 5:
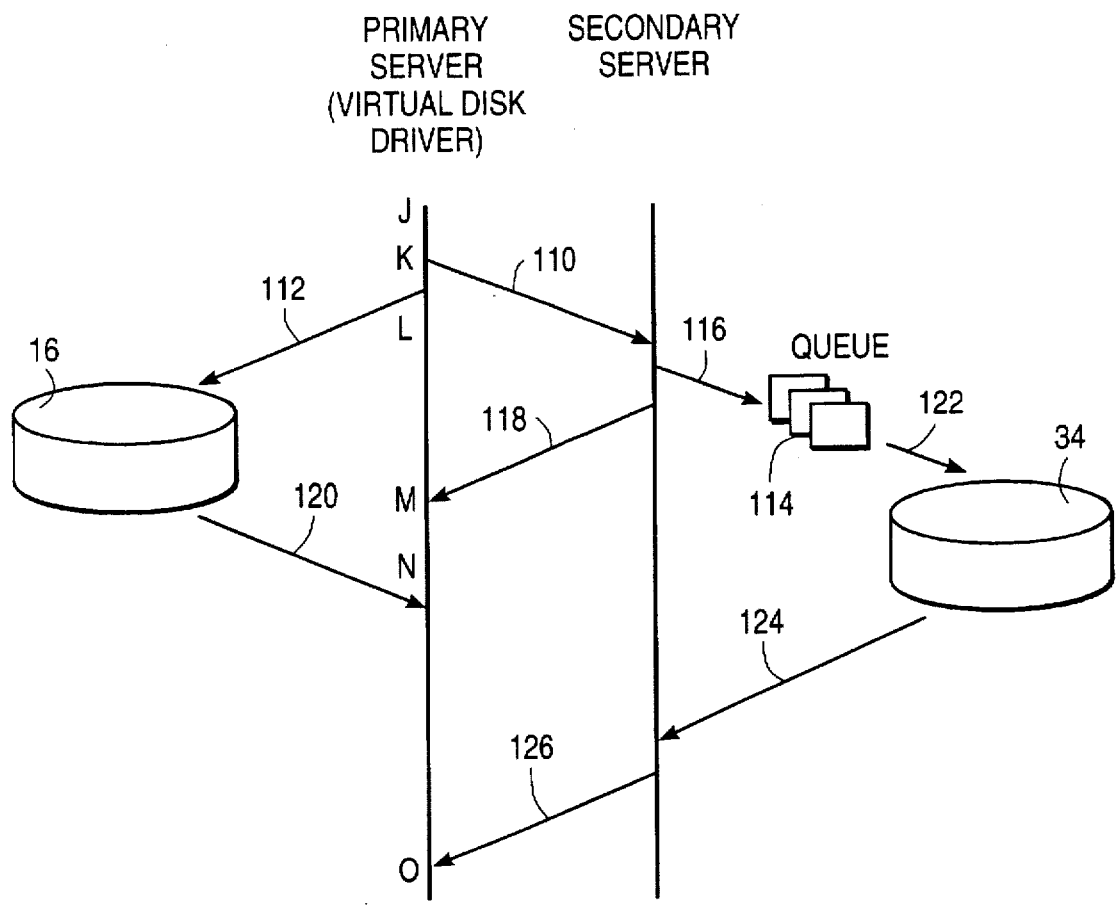
FIG. 5 illustrates another process of mirroring a hard disk write request on the secondary server.

FIG. 5 shows another process of mirroring a hard disk write request on the secondary server according to the present invention. Unlike the first embodiment, this embodiment does not guarantee that the secondary server will be at least as current as the primary server in the event that the data links between the primary and secondary server have a delay. However, this embodiment provides an increase in performance, which may be especially important in systems that are far apart or utilize a relatively slow data link between the primary and secondary servers.

The vertical lines represent time lines for the execution of a disk write request on both servers. After an application makes a call to the operating system to write data to the mirrored disk drive, the application transfers control to the operating system until control is returned to the application.

At time J, the virtual disk driver receives a disk write request from the operating system. The virtual disk driver then prepares the disk write request to be transmitted to the secondary server. At time K, the virtual disk driver sends the disk write request to the secondary server via the high-speed data links as shown by arrow 110. Then, without waiting for acknowledgment from the secondary server, the virtual disk driver sends the disk write request to local hard drive 16 at time L as shown by arrow 112.

After the secondary server receives the disk write request, it puts the disk write request on a write queue 114 as shown by arrow 116. The secondary server then sends an acknowledgment message to the virtual disk driver via the high-speed data links as shown by arrow 118. At time M, the virtual disk driver receives the acknowledgment message over the data links. The virtual disk driver treats the acknowledgment message as a message that the disk write request is complete on the remote hard drive for the purpose of returning control to the calling application. The virtual disk driver is inactive or sleeps between time L and time M so that other processes may be performed by the primary server. However, if the virtual disk driver does not receive the acknowledgment within a predetermined time period, the virtual disk driver resends the disk write request to the secondary server.

After the disk write request is complete on hard drive 16, the virtual disk drive is notified at time N as shown by arrow 120. Because the virtual disk driver treats the acknowledgment message as a message that the remote disk write is complete, the control returns to the calling application after time N. Conceptually, this is synchronous disk write operation and it provides a big gain in performance. However, in the event there is a delay between the data links and the primary server develops a problem after the disk write is complete on the local disk drive, the secondary server may develop a problem at a time just before the disk write is complete on the remote disk. Because of the delay, there is no guarantee that the secondary system is at least as current as the primary server in light of the assumption that if a problem occurs on the secondary server, it will not be before or immediately after a problem on the primary server occurs. In other words, the delay may be longer than what has been defined as "immediately after" in the assumption.

The secondary server sends the disk write request to remote hard drive 34 as shown by arrow 122. After the disk write request is performed on hard drive 34, the secondary server is notified that the write is complete as shown by arrow 124. The secondary server then sends a message to the virtual disk driver on the primary server via the high-speed data links that the disk write is complete as shown by arrow 126, thus allowing resources on the primary server to be freed up.

The process of FIG. 5 may also be used to implement asynchronous disk writes. Asynchronous disk writes return control to the calling application as soon as the disk write request is sent to the local disk, which is after time L. Asynchronous disk writes may provide a performance increase but there is no guarantee that the disk write request has been committed to the local or remote disk.

Figure 6:
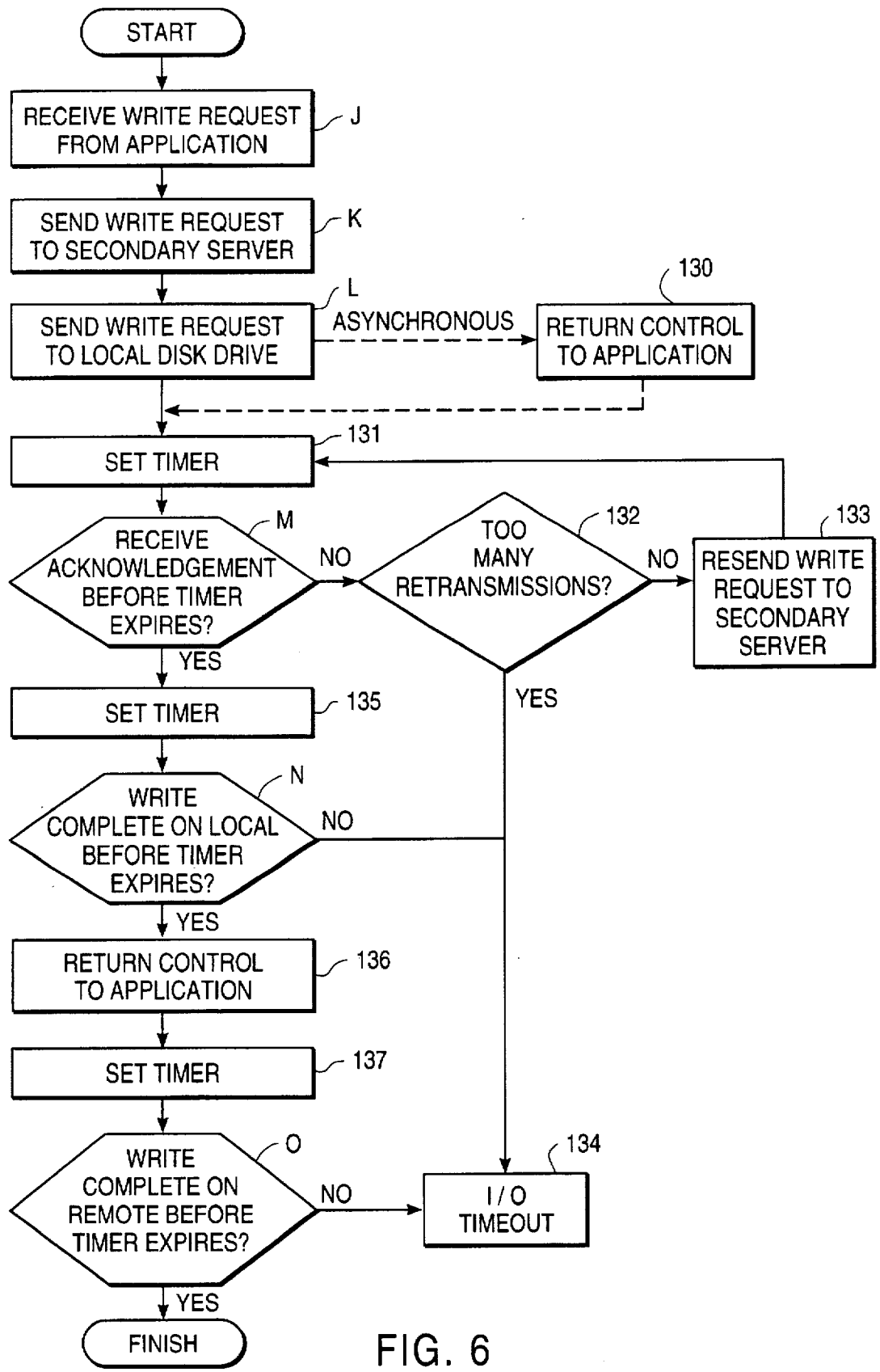
FIG. 6 illustrates the high level flow of the primary server performing the process of FIG. 5.

FIG. 6 shows a high level flowchart of the process of FIG. 5 as it executes on the primary server. Where a step corresponds to one of the times labelled in FIG. 5, the step is labelled with the same letter. In step J, the virtual disk driver receives a disk write request from an application that should be mirrored on the secondary server. At this time, the application typically has transferred control to the operating system. The virtual disk driver then sends the disk write request to the secondary server as in step K.

In step L, the virtual disk driver sends the disk write request to the local disk drive. If the disk write is asynchronous, the virtual disk driver then returns control to the application as shown in step 130. The virtual disk driver then sets an interrupt timer for a predetermined amount of time as shown in step 131.

In step M, the virtual disk driver waits to receive an acknowledgment message from the secondary server that the disk write request was received by the secondary server. The acknowledgment message should be received before the virtual disk driver receives the timer interrupt, meaning the timer expired. If the virtual disk driver receives the timer interrupt first, the virtual disk driver checks to see if the disk write request has already been sent to the secondary server a predetermined number of times as shown in step 132. If not, the virtual disk driver will resend the disk write request as shown in step 133. Otherwise, the virtual disk driver has an I/O timeout as shown in step 134.

If the virtual disk driver receives the acknowledgment message before the timer expires, the virtual disk driver sets an interrupt timer as shown in step 135. The virtual disk driver then waits to receive a message that the disk write request is complete on the local disk drive before the timer expires as shown in step N. If the timer expires first, the virtual disk driver has an I/O timeout as shown in step 134. Otherwise, in synchronous disk writes, the virtual disk driver returns control to the calling application as shown in step 136. This step will only be performed for a synchronous disk write because if the disk write is asynchronous, control has already been returned to the application in step 130.

In one implementation, the hard drive controller of the local hard drive sets the timer of step 135 when the disk write request is sent to the local disk drive. The hard drive controller returns the I/O status of the disk write to the virtual disk driver. Therefore, in step N, the virtual disk driver is waiting for the I/O status from the hard drive controller. Other variations and implementations will be readily apparent to those of ordinary skill in the art.

In step 137, the virtual disk driver sets an interrupt timer. The virtual disk driver then waits to receive a message that the disk write request is complete on the remote disk drive before the timer expires as shown in step 0. If the timer expires first, the virtual disk driver has an I/O timeout as shown in step 134. Otherwise, the receipt of the messages that the disk write request is complete on both local and remote hard disks allows resources to be freed up on the primary server.

Although this embodiment does not guarantee that the secondary server will be at least as current as the primary server in the event of a data link delay, it does provide higher performance. Thus, if there is a data link delay and the secondary server fails after the primary server fails, data may be lost. However, in most systems, the probability of this happening is very small.

UNIX Implementation

In one implementation, the present invention operates under the Santa Cruz Operations (SCO) UNIX operating system. Each network disk device should be viewed as a generalization of a local disk device. It is associated with a pair: a remote host and a remote device. To the user on the local host, it is like any local disk device. Therefore, it should be mountable and could be configured as a mirrored disk component (or even a striping disk component). However, the remote disk on the remote host is not mounted. In addition, for a system where the local mirrored disk capability is not readily available, a network disk could itself be configured to do mirroring on local disks.

Figure 7:
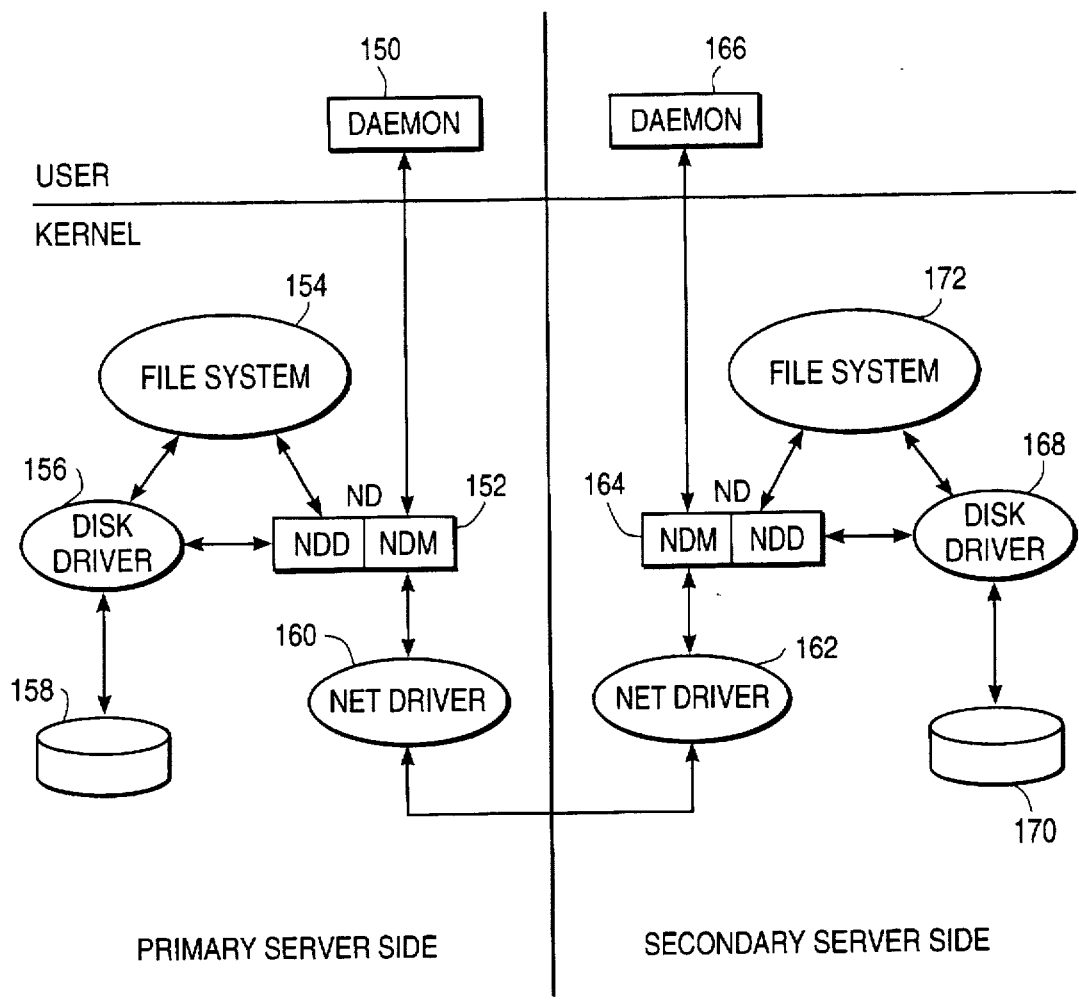
FIG. 7 illustrates the architecture of an embodiment of the present invention implemented in a UNIX environment.

FIG. 7 shows the architecture of an embodiment of the present invention in a UNIX environment. The architecture is shown divided horizontally into a User level and a system Kernel level. The architecture is also shown divided vertically into the primary server side and the secondary server side. The software modules in ellipses are existing UNIX kernel modules and the software modules in rectangles are software modules implementing the present invention.

A network disk daemon 150 sets up a Network Disk (ND) 152 kernel module. The ND consists of two components: a Network Disk Driver (NDD) and a Network Disk Module (NDM). NDD operates as a virtual disk driver between the file system and the disk driver. NDM performs the network communication between the primary and secondary servers (e.g., using AT&T' streams). Logically, ND should be viewed as a virtual disk driver on the primary server side and as a disk server on the secondary server side. The implementation is designed to be symmetric so that the same software runs on both the primary and secondary servers.

On the primary server side, the daemon is used to set up the virtual disk driver ND. The daemon is a user level daemon that is executed as part of the system start up procedure. The following is the general functions of the daemon:

1. Open the network driver for Inter-System Link (ISL) and bind it to a fixed port, conforming to any link interface standard (e.g., the SCO LLI) that exists in the operating system.
2. Push NDM on top of the network driver.
3. Read and parse a configuration file which contains a line with the following format for each disk component:

nn, device name, host name, flags where nn is a device number of the virtual disk device to which this component belongs, device name is the pathname or the major/minor number pair of a physical disk device, host name is the name of the server where the physical disk resides, and flags contains flags for device configuration such as indicating whether the device is a primary device or a secondary device.

4. Make an ioctl call to send the configuration information down to the kernel module NDD which creates a configuration table.
5. Create the network disk devices (e.g., /dev/nd1, /dev/nd2) if they have not already been created.
6. Make system fork calls to create multiple copies of the daemon.
7. Make an ioctl call to NDM and sleep on the input queue.

NDD is the disk driver part of ND. It is implemented as a standard disk driver for the operating system. As such it should adhere to the interface specifications and provide standard services for the users. NDD contains code to handle the functionalities of both the primary and secondary servers.

NDD's major function is to accept user request through a file system 154 and to direct the requests to the secondary server through NDM. In disk mirroring, one write request will be translated into multiple write requests, one local and one or more remote write requests.

A write request comes with a disk address (block number) and a count (number of blocks to write). Data to be written and the target device can be located through a buffer pointer or a pointer to a scatter-gather list. NDD processes the write request by first placing the remote write request in a streams buffer. NDD then passes the streams buffer to NDM to send to the secondary server. NDD later sends the local request by simply directing the request to local disk driver 156. Disk driver 156 sends this local write request to a local hard drive 158. The timing of when NDD will send the local disk write request depends on the embodiment or procedure the virtual disk driver is using as described earlier in reference to FIGS. 3–6.

Using the internally maintained configuration table, NDM constructs a remote disk request including the streams buffer and sends it to a net driver 160. Net driver 160 controls the high-speed data links between the primary and secondary servers.

On the secondary server side, a net driver 162 receives the disk request and passes it on to NDM on the secondary server side, which is a part of a ND 164. After NDM on the secondary server has received the complete disk request, NDM puts it on an input queue and sends a positive acknowledgment (ACK) back to the primary server. Then, NDM wakes up a copy of the daemon 166. On waking up, the daemon retrieves a message from the input queue and forwards it to NDD. To speed up retransmission, NDM sends a negative acknowledgment (NACK) back to the primary server if any error condition occurs (e.g., input queue is full).

NDD sends the remote write request to a disk driver 168 on the secondary server side. Disk driver 168 sends this remote write request to a remote hard drive 170. The secondary server also has a file system 172.

Figure 8:
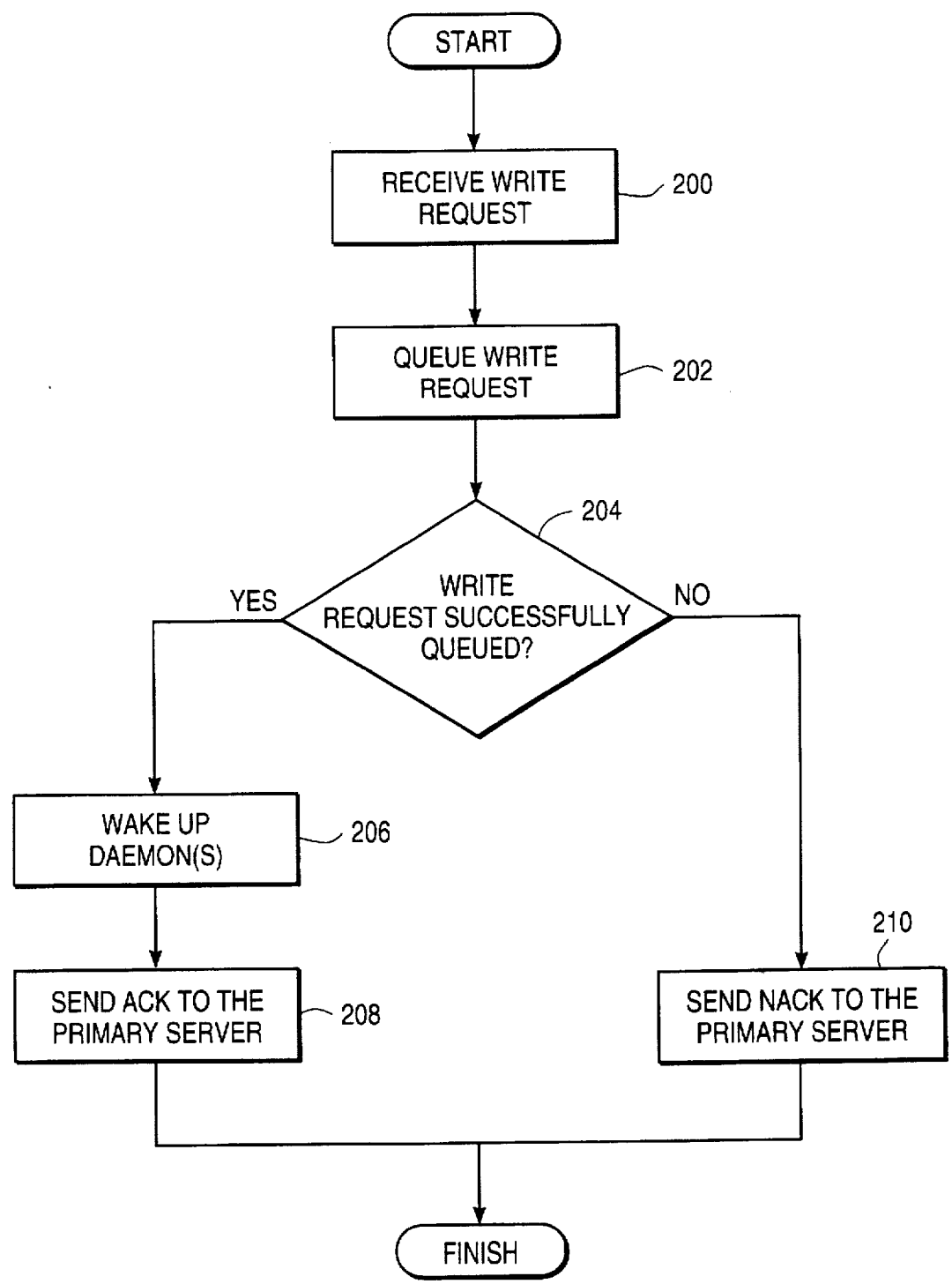
FIG. 8 illustrates the high level flow of the Network Disk on the secondary server.

FIG. 8 shows a high level flowchart of the operation of ND on the secondary server. In step 200, ND receives a disk write request from the primary server. After ND has received the complete disk write request, ND attempts to queue the disk write request as shown in step 202.

In step 204, ND checks to see if the disk write request was successfully queued. If it was successfully queued, ND then wakes up the daemons that are sleeping on the secondary server as shown in step 206. ND then sends an ACK to the primary server via the high-speed data links as shown in step 208. However, if the disk write request was not successfully queued, ND sends a NACK to the primary server via the high-speed data links as shown in step 210. The NACK is sent to the primary server so that the primary server can resend the disk write request without waiting for a timeout.

Figure 9:
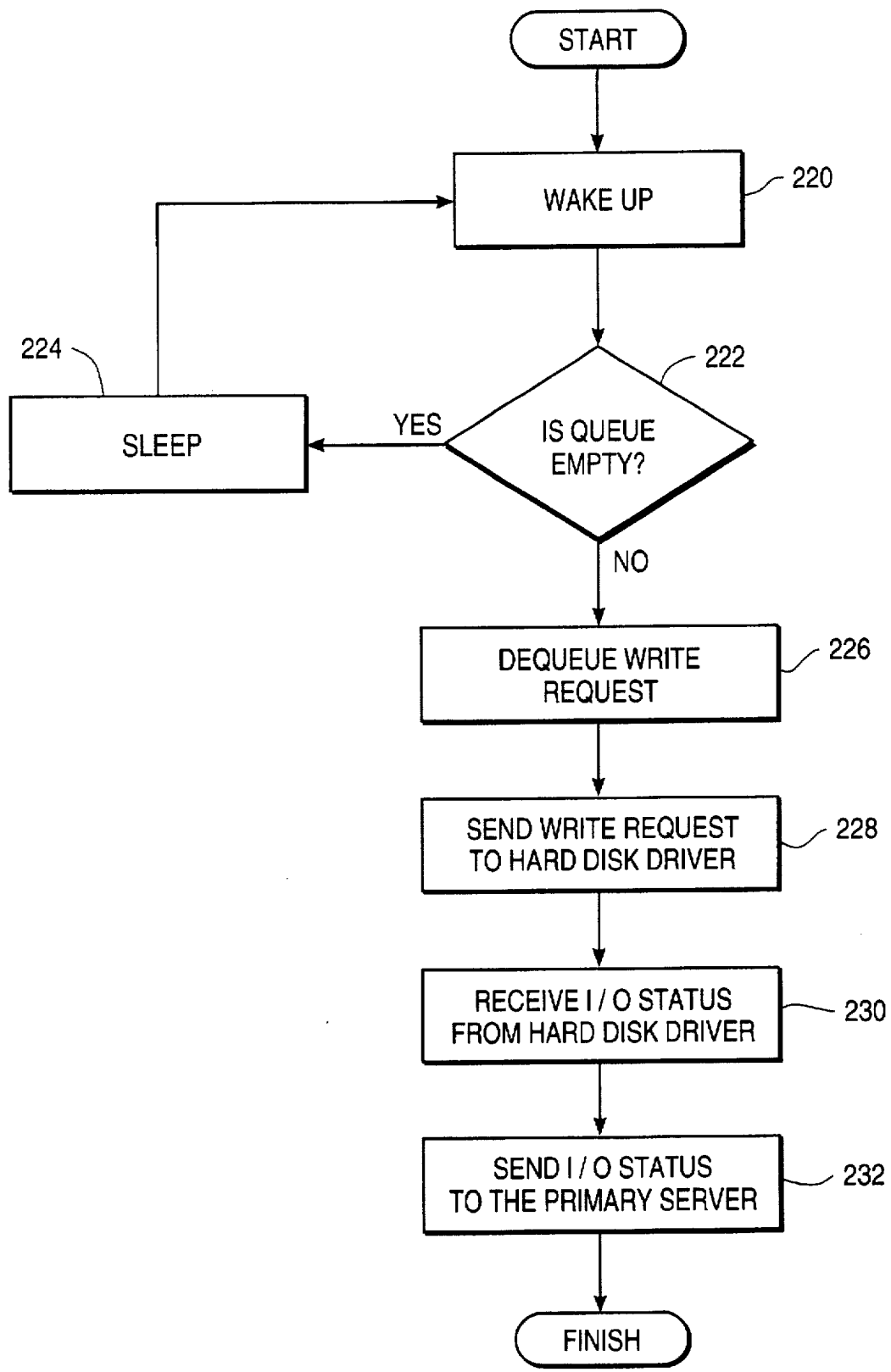
FIG. 9 illustrates the high level flow of the daemon on the secondary server.

FIG. 9 shows a high level flowchart of the operation of a daemon on the secondary server. After the daemon is setup, the daemon is sleeping. In step 220, the daemon wakes up in response to NDM. The daemon then checks to see if the queue is empty as shown in step 222. If the queue is empty, meaning there are no disk write requests to be processed, the daemon sleeps as shown in step 224. If the queue is not empty, the daemon takes a disk write request off the queue as shown in step 226.

In step 228, the daemon the sends the disk write request to disk driver 168 on the secondary server. After the daemon receives the I/O status of the disk write from the disk driver in step 230, the daemon sends the I/O status to the primary server via the high-speed data links as shown in step 232.

Disk errors are handled a little differently for mirrored disks. A bad disk write on the local disk drive is not treated as a real Input/Output (I/O) error because the sector data may still be read from the remote disk drive. Preferably, the disk write data is written to a good sector on the local disk. However, a bad disk write on the remote disk drive is treated as a real I/O error even when the write operation on the local disk drive is good. This arrangement is to guarantee that the remote disk is usable if the primary server crashes and the secondary server has to run in takeover mode. All read requests are initially directed to the local disk drive. If the read request cannot be completed on the local disk drive, the remote disk drive is tried. If the read request failure was due to a bad sector, the sector may be read from the remote disk drive and copied to a good sector on the local disk drive.

Tests were performed on the UNIX implementation utilizing the first embodiment. Three different computer systems were available and they were as follows:

SYS1 - single CPU Pentium system with an Eagle ethernet card;

SYS2 - single CPU Pentium system with an Eagle ethernet card; and

SYS3 - Acer Power 500 system (486DX/33 MHz) with a Western Digital ethernet card.

Measurements were taken by running a test which writes a 45 MB file from memory to disk. The following table represents the average number of seconds that the test required from 10 measurements:

| from/to | SYS1* | SYS2 | SYS3 |
|---|---|---|---|
| SYS1 | 57.46 | 61.5 | 105.2 |
|  | (802 KB/s) | (749 KB/s) | (438 KB/s) |
| SYS2 | 61.08 | 56.1* | 104.2 |
| SYS3 | (754 KB/s) | (821 KB/s) | (442 KB/s) |
|  | 105.85 | 106 | 102.86* |
|  | (435 KB/s) | (434 KB/s) | (448 KB/s) | where the asterisk indicates measurements of the test that involved only local disk writes and did not involve any mirroring.

The foregoing data results in the following disk overhead calculations, where overhead is measured against the speed of the slower disk:

| | |
|---|---|
| SYS1 → SYS2 | 7.0% |
| SYS2 → SYS1 | 6.3% |
| SYS3 → SYS1 | 2.9% |
| SYS3 → SYS1 | 3.1% |
| SYS1 → SYS3 | 2.3% |
| SYS2 → SYS3 | 1.3% |

As can be seen, the present invention achieves high availability while providing high performance as a result of low overhead.

Conclusion

The present invention provides high-performance methods and systems for mirroring hard disk data over a network with very low overhead. Embodiments of the present invention require relatively few lines of code. This is important because experience shows that the software failure rate is directly proportional to thousands of lines of code. Thus, the present invention not only substantially increases the availability of data, it does so without substantially degrading performance or reliability.

Under the assumption that if a problem occurs on the secondary server, it will not be before or immediately after a problem on the primary server occurs, one embodiment guarantees that the secondary server will be at least as up to date as the primary server even if the data links between the primary and secondary servers have a delay. Another embodiment provides a performance increase with the slight loss of availability because it does not guarantee that the secondary server will be at least as up to date as the primary server if the data links have a delay.

While the above is a complete description of specific embodiments of the invention, various modifications, alternative constructions, and equivalents may be used. For example, the present invention has been described as mirroring a local disk on a remote disk; however, the present invention can also be used to mirror a local disk on a local disk, a remote disk on a remote disk, or any number and combination of disks. Also, the present invention may be implemented with multiple primary and/or secondary servers. Therefore, the above description should not be taken as limiting the scope of the invention as defined by the following claims.

What is claimed is:

1. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second system;

providing a virtual disk driver that operates on the first computer system;

said virtual disk driver sending over the network to the second computer system a disk write request from a program, said disk write request specifying said portion of the first disk drive of the first computer system; and said virtual disk driver initiating said disk write request to the first disk drive after sending said disk write request to the second computer system in order to duplicate said portion on the second computer system.

2. The method of claim 1, further comprising the step of the second computer system storing said disk write request in a queue before said portion is duplicated on the second computer system.

3. The method of claim 1, further comprising the steps of:

the second computer system sending an acknowledgment message to the first computer system once said disk write request is received; and said virtual disk driver resending said disk write request to the second computer system if said virtual disk driver does not receive said acknowledgment within a predetermined time.

4. The method of claim 1, wherein said disk write request is performed on the first and second computer systems concurrently.

5. The method of claim 1, wherein said virtual disk driver receives commands from an operating system of the first computer system and sends commands to a disk driver of the first computer system.

6. The method of claim 5, wherein said disk driver remains unmodified.

7. The method of claim 5, wherein said operating system remains unmodified.

8. The method of claim 1, further comprising the steps of:

providing a disk server that operates on the second computer system; and said disk server sending said disk write request to the second disk drive of the second computer system.

9. The method of claim 8, wherein a copy of said virtual disk driver operates on the second computer system as said disk server.

10. The method of claim 1, wherein said portion includes all data on the first disk drive.

11. The method of claim 1, wherein said virtual disk driver duplicates all the disk drives of the first computer system on the second computer system.

12. The method of claim 1, further comprising the step of said virtual disk driver sending a failed disk read request specifying said portion to the second computer system over the network.

13. The method of claim 1, wherein the network includes a plurality of second computer systems and the method includes the step of said virtual disk driver sending over the network to said plurality of second computer systems said disk write request before the step of said virtual disk driver sending said disk write request to the first disk drive, whereby said portion is duplicated on said plurality of second computer systems.

14. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system;

the second computer system sending an acknowledgment message to the first computer system once said disk write request is received, said virtual disk driver sending said disk write request to the first disk drive only after receipt of said acknowledgment message; and suspending control of said program until said virtual disk driver sends said disk write request to the first disk drive;

whereby said portion is duplicated on the second computer system.

15. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system;

the second computer system sending an acknowledgment message to the first computer system once said disk write request is received, said virtual disk driver sending said disk write request to the first disk drive only after receipt of said acknowledgment message;

said virtual disk driver receiving a first write complete message from the first disk drive when said disk write request has been written to said portion;

said virtual disk driver receiving a second write complete message from the second computer system when said disk write request has been written to the second disk drive of the second computer system; and suspending control of said program until said virtual disk driver receives both of said first and second write complete messages;

whereby said portion is duplicated on the second computer system.

16. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system; and suspending control of said program until said virtual disk driver sends said disk write request to the first disk drive;

whereby said portion is duplicated on the second computer system.

17. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system;

said virtual disk driver receiving a first write complete message from the first disk drive when said disk write request has been written to said portion;

said virtual disk driver receiving an acknowledgment message from the second computer system when said disk write request has been received by the second computer system; and suspending control of said program until said virtual disk driver receives said first write complete message and said acknowledgment message;

whereby said portion is duplicated on the second computer system.

18. The method of claim 17, further comprising the step of the second computer system sending a second write complete message to the first computer system when said disk write request has been written to the second disk drive of the second computer system.

19. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

the second computer system sending an acknowledgment message to the first computer system once said disk write request is received;

said virtual disk driver sending said disk write request to the first disk drive only after receipt of said acknowledgment message; and suspending control of said program until said virtual disk driver sends said disk write request to the first disk drive.

20. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

the second computer system sending an acknowledgment message to the first computer system once said disk write request is received;

said virtual disk driver sending said disk write request to the first disk drive only after receipt of said acknowledgment message;

said virtual disk driver receiving a first write complete message from the first disk drive when said disk write request has been written to said portion;

said virtual disk driver receiving a second write complete message from the second computer system when said disk write request has been written to the second disk drive of the second computer system; and suspending control of said program until said virtual disk driver receives both of said first and second write complete messages.

21. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system; and suspending control of said program until said virtual disk driver sends said disk write request to the first disk drive.

22. In a network including first and second computer systems, the first and second computer systems having respective first and second processing units, disk drives and network interfaces, a method of improving the availability of data stored therein comprising the steps of:

selecting a portion of the first disk drive of the first computer system to be duplicated on the second computer system;

providing a virtual disk driver that operates on the first computer system;

said virtual disk driver sending over the network to the second computer system a disk write request from a program, said disk write request specifying said portion of the first disk drive of the first computer system;

said virtual disk driver sending said disk write request to the first disk drive after sending said disk write request to the second computer system;

said virtual disk driver receiving a first write complete message from the first disk drive when said disk write request has been written to said portion;

said virtual disk driver receiving an acknowledgment message from the second computer system when said disk write request has been received by the second computer system; and suspending control of said program until said virtual disk driver receives said first write complete message and said acknowledgment message.

23. The method of claim 22, further comprising the step of the second computer system sending a second write complete message to the first computer system when said disk write request has been written to the second disk drive of the second computer system.

24. A computer system network for improving the availability of data stored therein, comprising:

a first computer system having a first processing unit, disk drive and network interface, wherein a portion of said first disk drive of said first computer system is to be duplicated;

a second computer system coupled to the first computer system over a network, said second computer system having a second processing unit, disk drive and network interface, wherein said portion is to be duplicated on said second computer system; and a virtual disk driver operating on said first computer system, said virtual disk driver sending over the network to the second computer system a disk write request from a program in order to duplicate said portion on said second computer system, said disk write request specifying said portion, and thereafter said virtual disk driver sending said disk write request to the first disk drive.

25. The computer system network of claim 24, further comprising a queue on said second computer system that stores said disk write request before said portion is duplicated on said second computer system.

26. A computer program product for improving the availability of data, comprising:

code for a virtual disk driver operating a first computer that sends a disk write request over a network to a second computer system, said disk write request specifying a portion of a first dick drive of the first computer system;

code for said virtual disk driver that sends said disk write request to the first disk drive in order to duplicate said portion on the second computer system, said disk write request being initiated to said first disk drive after said disk write request is sent to the second computer system; and a computer readable medium that stores the codes.

27. The computer program product of claim 26, further comprising:

code that sends said disk write request to the first disk drive only after receipt of an acknowledgment message from the second computer system that said disk write request was received; and code that suspends control of a program sending said disk write request until said disk write request is sent to the first disk drive.

28. A computer program product for improving the availability of data, comprising:

code for a virtual disk driver operating a first computer that sends a disk write request over a network to a second computer system, said disk write request specifying a portion of a first disk drive of the first computer system;

code for said virtual disk driver that sends said disk write request to the first disk drive after sending said disk write request to the second computer system;

code that sends said disk write request to the first disk drive only after receipt of an acknowledgment message from the second computer system that said disk write request was received;

code that suspends control of a program sending said disk write request until receipt of a first write complete message from the first disk drive that said disk write request has been written to said portion and receipt of a second write complete message from the second computer system that said disk write request has been written on a second disk drive; and a computer readable medium that stores the codes;

whereby said portion is duplicated on the second computer system.

29. A computer program product for improving the availability of data, comprising:

code for a virtual disk driver operating a first computer that sends a disk write request over a network to a second computer system, said disk write request specifying a portion of a first disk drive of the first computer system;

code for said virtual disk driver that sends said disk write request to the first disk drive after sending said disk write request to the second computer system;

code that suspends control of a program sending said disk write request until said disk write request is sent to the first disk drive; and a computer readable medium that stores the codes;

whereby said portion is duplicated on the second computer system.

30. A computer program product for improving the availability of data, comprising:

code for a virtual disk driver operating a first computer that sends a disk write request over a network to a second computer system, said disk write request specifying a portion of a first disk drive of the first computer system;

code for said virtual disk driver that sends said disk write request to the first disk drive after sending said disk write request to the second computer system;

code that suspends control of a program sending said disk write request until receipt of a first write complete message from the first disk drive that said disk write request has been written to said portion and receipt of an acknowledgment message from the second computer system that said disk write request has been received by the second computer system; and a computer readable medium that stores the codes;

whereby said portion is duplicated on the second computer system.

31. The computer program product of claim 30, further comprising code that receives a second write complete message from the second computer system that said disk write request has been written to a second disk drive.

* * * * *